United States Patent
Cook et al.

(10) Patent No.: US 9,909,563 B2
(45) Date of Patent: Mar. 6, 2018

(54) SYSTEM AND METHOD FOR MONITORING AND CONTROLLING WIND TURBINE BLADE DEFLECTION

(71) Applicant: General Electric Company, Schenectady, NY (US)

(72) Inventors: Mark Lee Cook, Tehachapi, CA (US); Nadine Schuell, Laurens, SC (US)

(73) Assignee: General Electric Company, Schenectady, NY (US)

(*) Notice: Subject to any disclaimer, the term of this patent is extended or adjusted under 35 U.S.C. 154(b) by 572 days.

(21) Appl. No.: 14/550,144

(22) Filed: Nov. 21, 2014

(65) Prior Publication Data
US 2016/0146189 A1 May 26, 2016

(51) Int. Cl.
| F03D 7/02 | (2006.01) |
| F03D 17/00 | (2016.01) |
| F03D 7/04 | (2006.01) |

(52) U.S. Cl.
CPC ......... F03D 7/0288 (2013.01); F03D 7/0224 (2013.01); F03D 7/047 (2013.01);
(Continued)

(58) Field of Classification Search
CPC ...... F03D 7/0288; F03D 7/0224; F03D 7/047; F03D 17/00; F05B 2270/17;
(Continued)

(56) References Cited

U.S. PATENT DOCUMENTS

| 7,476,985 B2 * | 1/2009 | Llorente Gonzalez ............ F03D 7/0264 290/44 |
| 7,851,934 B2 * | 12/2010 | Nyborg ................ F03D 7/0224 290/44 |

(Continued)

FOREIGN PATENT DOCUMENTS

| CN | 103225587 | 7/2013 |
| EP | 2249030 A2 | 11/2010 |

(Continued)

OTHER PUBLICATIONS

Ying et al., "Blade Tip Deflection Calculations and Safety Analysis of Wind Turbine", Renewable Power Generation Conference (RPG 2013), 2nd IET, Beijing, pp. 1-5, Sep. 11, 2013.

(Continued)

*Primary Examiner* — Woody Lee, Jr.
*Assistant Examiner* — Adam W Brown
(74) *Attorney, Agent, or Firm* — Dority & Manning, P.A.

(57) ABSTRACT

A system and method for monitoring and controlling the deflection of rotor blades of a wind turbine so as to prevent tower strikes is disclosed. The method includes operating the wind turbine at standard pitch angle settings. Another step includes monitoring a loading condition of the wind turbine over a predetermined time period. A further step includes tracking a number of wind condition deviations of a certain magnitude occurring during a predetermined time period. The method also include altering one or more of the standard pitch settings of the rotor blades in response to the number (Continued)

of wind condition deviations exceeding a wind deviation threshold and/or the loading condition exceeding a loading threshold as an exceedance indicates an increased probability of rotor blade deflection. The method further includes performing one or more additional corrective actions so as to reduce the probability of a rotor blade tower strike.

20 Claims, 8 Drawing Sheets

(52) U.S. Cl.
CPC .......... *F03D 17/00* (2016.05); *F05B 2270/17* (2013.01); *F05B 2270/32* (2013.01); *F05B 2270/322* (2013.01); *F05B 2270/331* (2013.01); *Y02E 10/723* (2013.01)

(58) Field of Classification Search
CPC .......... F05B 2270/322; F05B 2270/331; F05B 2270/32; Y02E 10/723
See application file for complete search history.

(56) References Cited

U.S. PATENT DOCUMENTS

| | | | | |
|---|---|---|---|---|
| 7,964,979 | B2* | 6/2011 | Miranda | F03D 7/0224 290/44 |
| 8,441,138 | B2* | 5/2013 | Gjerlov | F03D 7/0224 290/44 |
| 9,683,551 | B2* | 6/2017 | Andersen | F03D 7/0256 |
| 2007/0018457 | A1 | 1/2007 | Llorente Gonzalez | |
| 2010/0226772 | A1 | 9/2010 | Deering | |
| 2010/0253569 | A1 | 10/2010 | Stiesdal | |
| 2013/0045098 | A1 | 2/2013 | Taylor | |
| 2013/0189102 | A1 | 7/2013 | Wedel-Heinen | |
| 2013/0287567 | A1 | 10/2013 | Olesen et al. | |
| 2014/0054894 | A1 | 2/2014 | Olesen | |
| 2014/0140844 | A1 | 5/2014 | Slot | |
| 2014/0203563 | A1 | 7/2014 | Bowyer et al. | |
| 2014/0294584 | A1 | 10/2014 | Canal Vila | |
| 2015/0132128 | A1 | 5/2015 | Zarb et al. | |

FOREIGN PATENT DOCUMENTS

| | | |
|---|---|---|
| EP | 2690285 A2 | 1/2014 |
| GB | 2 485 595 | 6/2012 |
| KR | 2013-0046858 | 5/2013 |
| WO | WO 2011/134473 A1 | 11/2011 |
| WO | WO 2014/078773 A1 | 5/2014 |

OTHER PUBLICATIONS

European Search Report and Written Opinion issued in connection with corresponding EP Application No. 15194067.3-1807 dated Apr. 8, 2016.

* cited by examiner

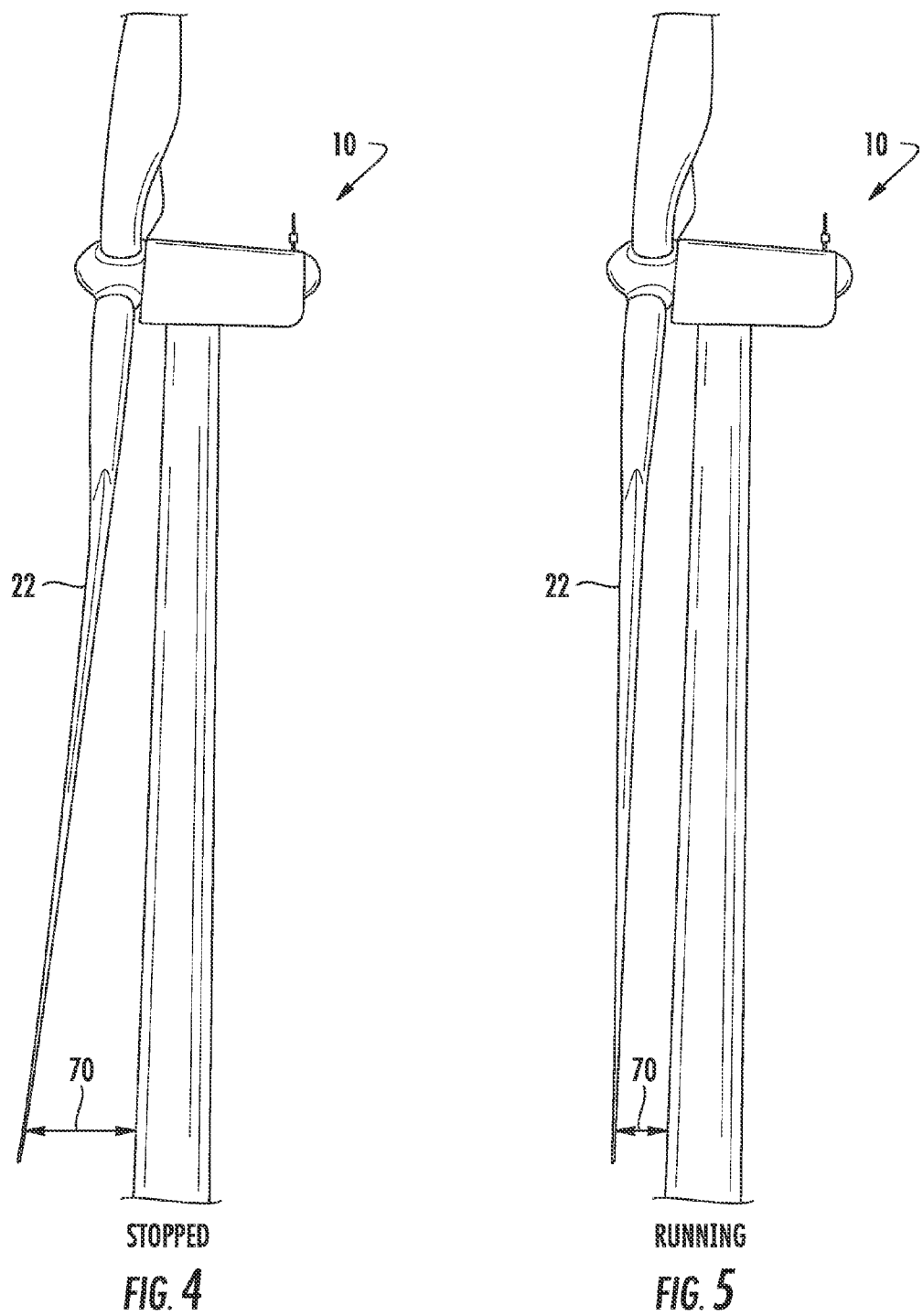
FIG. 4 STOPPED
FIG. 5 RUNNING

SYSTEM AND METHOD FOR MONITORING AND CONTROLLING WIND TURBINE BLADE DEFLECTION

FIELD OF THE INVENTION

The present subject matter relates generally to wind turbines and particularly to turbine blade deflection. More particularly, the present subject matter relates to systems and methods for monitoring and controlling turbine blade deflection during operation of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more turbine blades. The turbine blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the turbine blades. However, as is generally known, the deflection of a turbine blade is a function of blade length, aerodynamic loading, turbine operating states and blade stiffness. Thus, longer turbine blades may be subject to increased deflection forces, particularly when a wind turbine is operating in high-load conditions. This increased deflection can produce fatigue on the turbine blades and other components and can also increase the risk of the turbine blades striking the tower. A tower strike can significantly damage a turbine blade and the tower and, in some instances, can cause catastrophic failures. Accordingly, a tower strike may result in considerable downtime to repair or replace damaged components.

Known wind turbine systems determine turbine blade deflection by utilizing external sensors, which are typically mounted on the turbine blades or on the tower. These sensors are designed to sense turbine blade operating conditions (e.g. blade strain, blade acceleration or blade velocity) to enable blade deflection to be inferred or calculated. However, maintaining the sensors can be very costly and calibrating such sensors can be quite complex and time consuming. Moreover, since the sensors must be calibrated frequently, there is a concern with regard to the reliability of data transmitted from the sensors over an extended period of time.

Accordingly, there is a need for an improved system and method for monitoring and controlling wind turbine blade deflection that prevents blade tower strikes without the excessive complexity and costs of the aforementioned sensors.

BRIEF DESCRIPTION OF THE INVENTION

Aspects and advantages of the present subject matter will be set forth in part in the following description, or may be obvious from the description, or may be learned through practice of the invention.

In one aspect, the present subject matter provides a unique system for monitoring and controlling the deflection of rotor blades of a wind turbine. The method includes operating the wind turbine at standard pitch angle settings for the rotor blades. Another step includes monitoring a loading condition of the wind turbine over a predetermined time period. A further step includes tracking a number of wind condition deviations of a certain magnitude occurring during a predetermined time period. The method also include altering one or more of the standard pitch settings of the rotor blades in response to the number of wind condition deviations exceeding a wind deviation threshold and/or the loading condition exceeding a loading threshold as an exceedance above the wind deviation threshold and the loading threshold indicates an increased probability of a rotor blade deflection occurring in one or more of the rotor blades. In addition, the method includes performing one or more additional corrective actions so as to reduce the probability of a rotor blade tower strike.

In another aspect, the present disclosure is directed to a system for monitoring and controlling the deflection of rotor blades of a wind turbine. The system includes one or more sensors configured to monitor a loading condition of the wind turbine over a predetermined time period and a controller communicatively coupled to the one or more sensors. The controller is configured to perform one or more operations, including but not limited to, operating the wind turbine at standard pitch angle settings for the rotor blades, tracking a number of wind condition deviations of a certain amount occurring during a predetermined time period, altering one or more of the standard pitch settings of the rotor blades in response to the number of wind condition deviations exceeding a wind deviation threshold and/or the loading condition exceeding a loading threshold as an exceedance above the wind deviation threshold and the loading threshold indicates an increased probability of a rotor blade deflection occurring in one or more of the rotor blades, and performing one or more corrective actions so as to reduce the probability of a rotor blade tower strike.

In still another aspect, the present disclosure is directed to a method for preventing rotor blade tower strike of a wind turbine. The method includes monitoring a tower acceleration of a wind turbine tower over a predetermined time period. Another step includes tracking wind condition deviations during a predetermined time period. The method also includes altering one or more of the standard pitch settings of the rotor blades in response to the number of wind condition deviations exceeding a wind deviation threshold and/or the loading condition exceeding a loading threshold as an exceedance above the wind deviation threshold and the loading threshold indicates an increased probability of a rotor blade deflection occurring in one or more of the rotor blades.

These and other features, aspects and advantages of the present subject matter will become better understood with reference to the following description and appended claims. The accompanying drawings, which are incorporated in and constitute a part of this specification, illustrate embodiments of the present subject matter and, together with the description, serve to explain the principles of the present subject matter.

BRIEF DESCRIPTION OF THE DRAWING

A full and enabling disclosure of the present subject matter, including the best mode thereof, directed to one of ordinary skill in the art, is set forth in the specification, which makes reference to the appended figures, in which:

FIG. 4 illustrates a side view of one embodiment of a wind turbine in a stopped position according to the present disclosure;

FIG. 5 illustrates a side view of one embodiment of a wind turbine during operation according to the present disclosure;

DETAILED DESCRIPTION OF THE INVENTION

Figure 1:
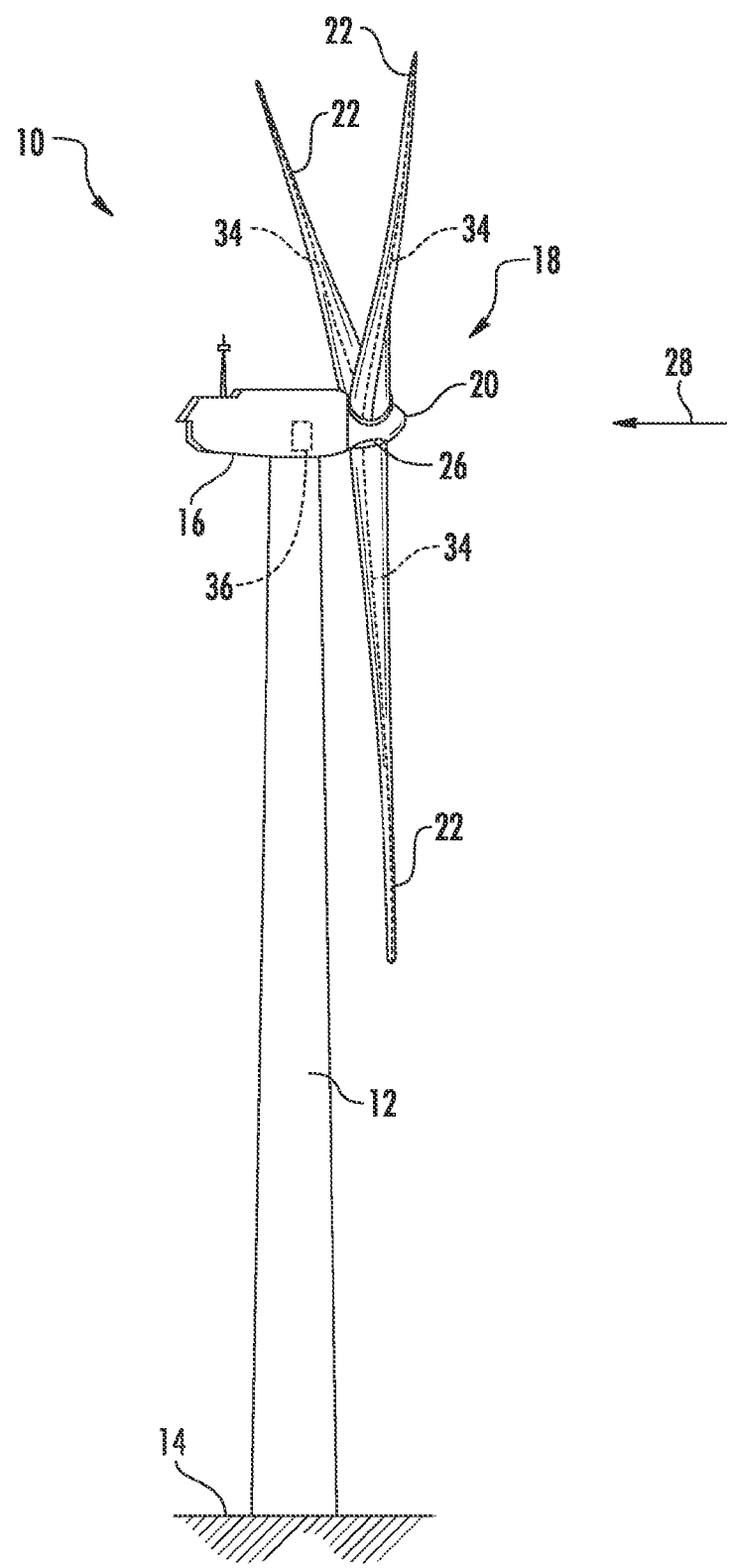
FIG. 1 illustrates a perspective view of a wind turbine according to the present disclosure.

Reference now will be made in detail to embodiments of the present subject matter, one or more examples of which are illustrated in the drawings. Each example is provided by way of explanation, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

Generally, the present disclosure provides a unique system for monitoring and controlling the deflection of rotor blades of a wind turbine to reduce risk during conditions believed to be associated with blade tower strikes. In one embodiment, the blade clearance control scheme of the present disclosure is activated by monitoring wind direction instability and elevated loads (based on sensing tower acceleration). Thus, when the control scheme is active, an additional blade pitch offset is introduced by the existing pitch control system. Thus, the operational blade angles are slightly higher such that the corresponding torque, power, loads, and deflection may be reduced. Further, blade edgewise stiffness in increased by the higher pitch angles, thereby resulting in less blade deflection and more clearance with the tower during operation. Accordingly, the altered pitch angle affect conditions when the blade typically deflects the most, i.e. at mid-level wind speed conditions.

Referring now to the drawings, FIG. 1 illustrates a perspective view of a horizontal-axis wind turbine 10. In the illustrated embodiment, the wind turbine 10 includes a tower 12 that extends from a support system 14, a nacelle 16 mounted on the tower 12, and a rotor 18 that is coupled to the nacelle 16. The rotor 18 includes a rotatable hub 20 and at least one turbine blade 22 coupled to and extending outward from the hub 20. As shown, the rotor 18 includes three rotor blades 22. However, in an alternative embodiment, the rotor 18 may include more or less than three rotor blades 22. Additionally, in the illustrated embodiment, the tower 12 is fabricated from tubular steel to define a cavity (not illustrated) between the support system 14 and the nacelle 16. In an alternative embodiment, the tower 12 may be any suitable type of tower having any suitable height.

The rotor blades 22 may generally have any suitable length that enables the wind turbine 10 to function as described herein. Additionally, the rotor blades 22 may be spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator 24 (FIG. 2) positioned within the nacelle 16 to permit electrical energy to be produced. Further, the rotor blades 22 may be mated to the hub 20 by coupling a blade root portion to the hub 20 at a plurality of load transfer regions 26. Thus, any loads induced to the rotor blades 22 are transferred to the hub 20 via the load transfer regions 26.

Figure 2:
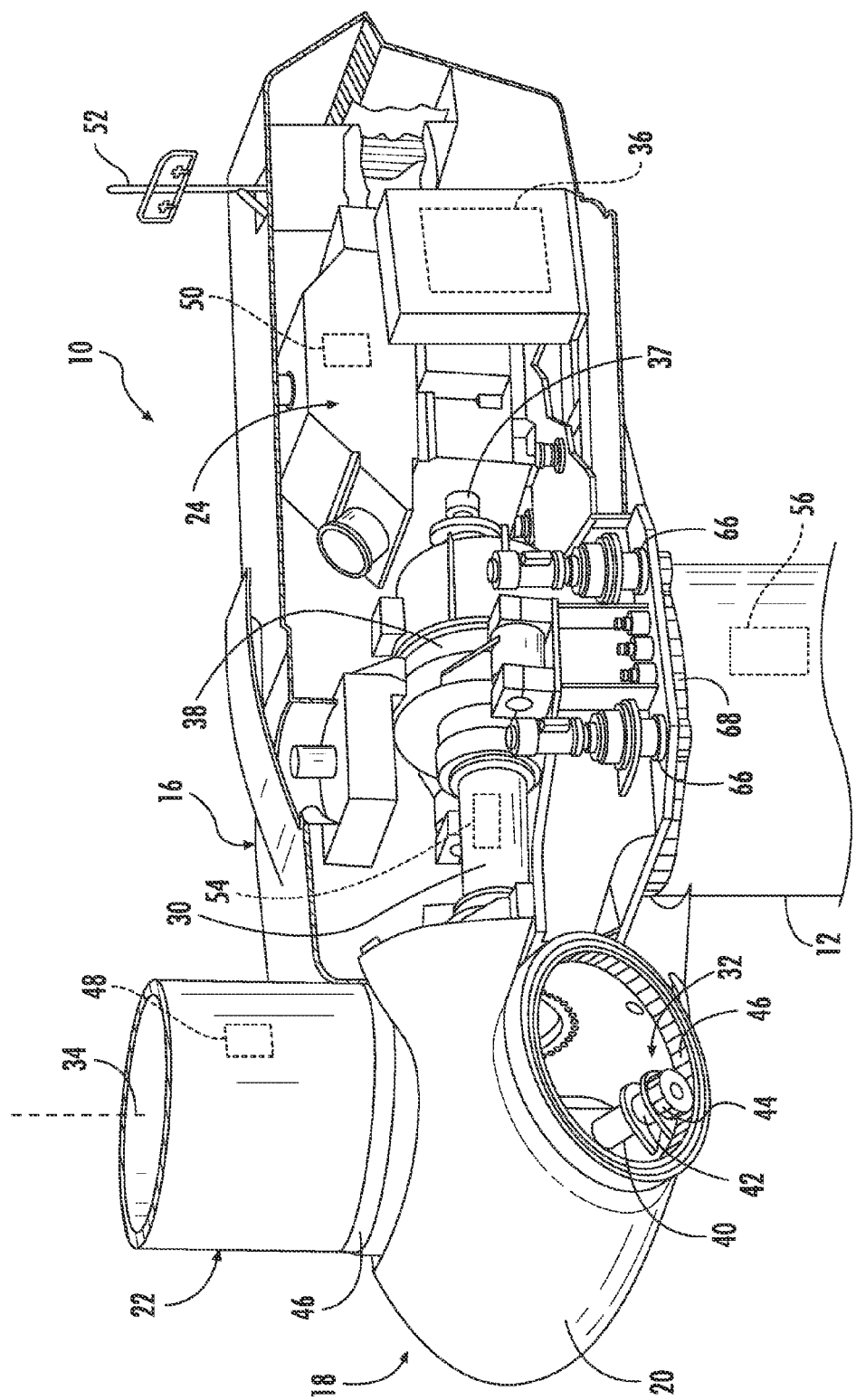
FIG. 2 illustrates a detailed view of one embodiment of a nacelle of a wind turbine according to the present disclosure.

Referring to FIG. 2, a simplified, internal view of one embodiment of the nacelle 16 of the wind turbine 10 shown in FIG. 1 is illustrated. As shown, the generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 30 coupled to the hub 20 for rotation therewith. The rotor shaft 30 may, in turn, be rotatably coupled to a generator shaft 37 of the generator 24 through a gearbox 38. As is generally understood, the rotor shaft 30 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 37 and, thus, the generator 24.

Each rotor blade 22 may also include a pitch adjustment mechanism 32 configured to rotate each rotor blade 22 about its pitch axis 34. Further, each pitch adjustment mechanism 32 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 34. Similarly, the wind turbine 10 may include one or more yaw drive mechanisms 66 being configured to change the angle of the nacelle 16 relative to the wind (e.g., by engaging a yaw bearing 68 of the wind turbine 10).

As shown in the illustrated embodiment, the wind turbine 10 may also include a turbine control system or turbine controller 36 centralized within the nacelle 16. However, it should be appreciated that the controller 36 may be disposed at any location on or in the wind turbine 10, at any location on the support system 14 or generally at any other location. The controller 36 may be configured to control the various operating modes of the wind turbine 10 (e.g., start-up or shut-down sequences). Additionally, the controller 36 may be configured to control a pitch angle or offset of each of the rotor blades 22 (i.e., an angle that determines a perspective of the rotor blades 22 with respect to the direction 28 of the wind) to control the load and power generated by the wind turbine 10 by adjusting an angular position of at least one rotor blade 22 relative to the wind. For instance, the controller 36 may control the blade pitch of the rotor blades 22, either individually or simultaneously, by controlling a pitch adjustment system 32 as described above. Further, as the direction 28 of the wind changes, the controller 36 may be configured to control a yaw direction of the nacelle 16 about a yaw axis to position the rotor blades 22 with respect to the direction 28 of the wind.

Figure 3:
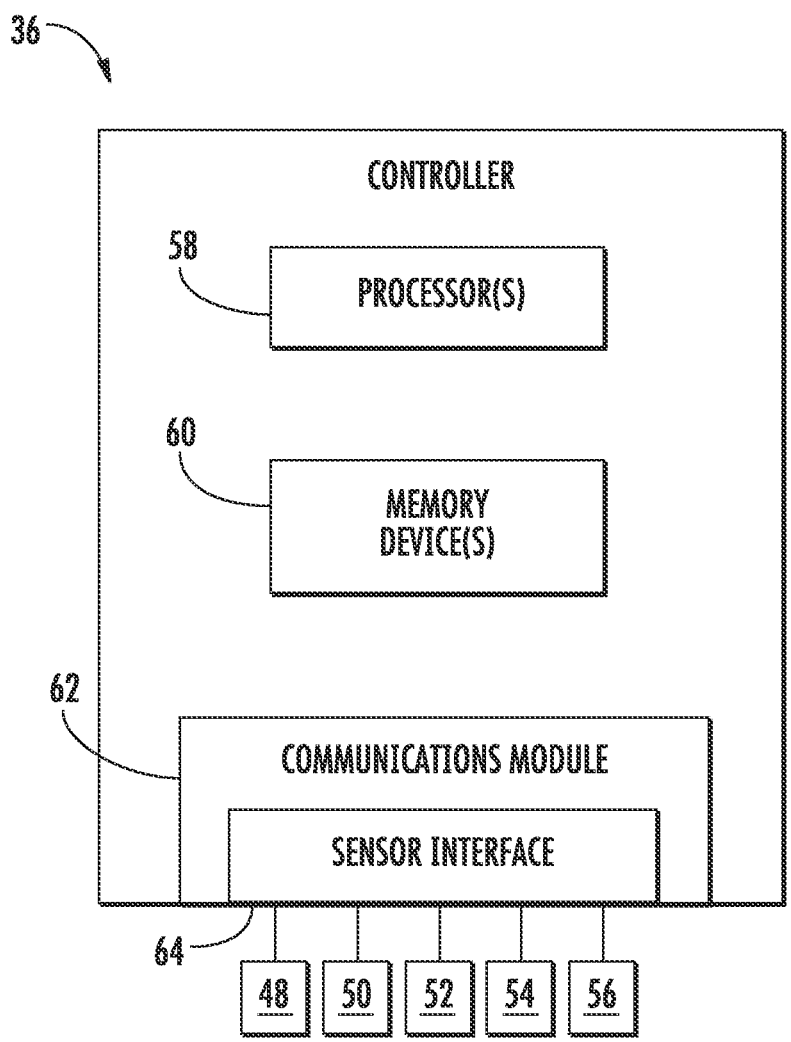
FIG. 3 illustrates a block diagram of one embodiment of a controller according to the present disclosure.

Referring now to FIG. 3, there is illustrated a block diagram of one embodiment of suitable components that may be included within the controller 36 in accordance with aspects of the present subject matter. As shown, the controller 36 may include one or more processor(s) 58 and associated memory device(s) 60 configured to perform a variety of computer-implemented functions (e.g., performing the methods, steps, calculations and the like and storing relevant data as disclosed herein). Additionally, the controller 36 may also include a communications module 62 to facilitate communications between the controller 36 and the various components of the wind turbine 10. Further, the communications module 62 may include a sensor interface 64 (e.g., one or more analog-to-digital converters) to permit signals transmitted from the sensors 48, 50, 52, 54, 56 (such as loading and/or operating conditions) to be converted into signals that can be understood and processed by the processors 58. It should be appreciated that the sensors 48, 50, 52, 54, 56 may be communicatively coupled to the communications module 62 using any suitable means. For example, as shown, the sensors 48, 50, 52, 54, 56 are coupled to the sensor interface 64 via a wired connection. However, in other embodiments, the sensors 48, 50, 52, 54, 56 may be coupled to the sensor interface 64 via a wireless connection, such as by using any suitable wireless communications protocol known in the art.

As mentioned, the sensors 48, 50, 52, 54, 56 are configured to monitor various operating and/or loading conditions of the wind turbine 10. For instance, in certain embodiments, certain operating or loadings conditions may include, but are not limited to, a pitch angle, a generator torque, a generator speed, a power output, or similar. In addition, the loading and/or operating conditions may also include derivatives of any monitored loading and/or operating conditions (e.g., blade velocity, tower acceleration, etc.). More specifically, as shown, the one or more sensors may include blade sensors 48 for monitoring the rotor blades 22; generator sensors 50 for monitoring the torque, the rotational speed, the acceleration and/or the power output of the generator 24; wind sensors 52 for monitoring the wind speed; and/or shaft sensors 54 for measuring the loads acting on the rotor shaft 30 and/or the rotational speed of the rotor shaft 30. Additionally, the wind turbine 10 may include one or more tower sensors 56 for measuring the loads transmitted through the tower 12 and/or the acceleration of the tower 12. Of course, the wind turbine 10 may further include various other suitable sensors for measuring any other suitable loading and/or operating conditions of the wind turbine 10. For example, the wind turbine 10 may also include one or more sensors (e.g., accelerometers) for monitoring the acceleration of the gearbox 38 and/or the acceleration of one or more structural components of the machine head (e.g., the generator frame, the main frame or bedplate, etc.).

During operation, as the rotor blades 22 are rotated by the wind and subjected to centrifugal forces, the blades 22 are subjected to various forces and bending moments. As such, the blades 22 may deflect from a neutral, or non-deflected, position to a deflected position. For example, as shown in FIGS. 4 and 5, the non-deflected blade clearance, distance 70 (FIG. 4), represents the distance between the rotor blades 22 and the tower 12 when the blades 22 are in a non-deflected position (i.e. when the wind turbine is stopped or not operating). However, forces and bending moments acting on the rotor blades 22 during operation may cause the blades 22 to deflect towards the tower 12, as shown in FIG. 5, thereby reducing the overall blade clearance 70. As aerodynamic loads increase, excessive forces and bending moments can cause one or more of the blades 22 to strike the tower 12 resulting in significant damage and downtime.

Figure 6:
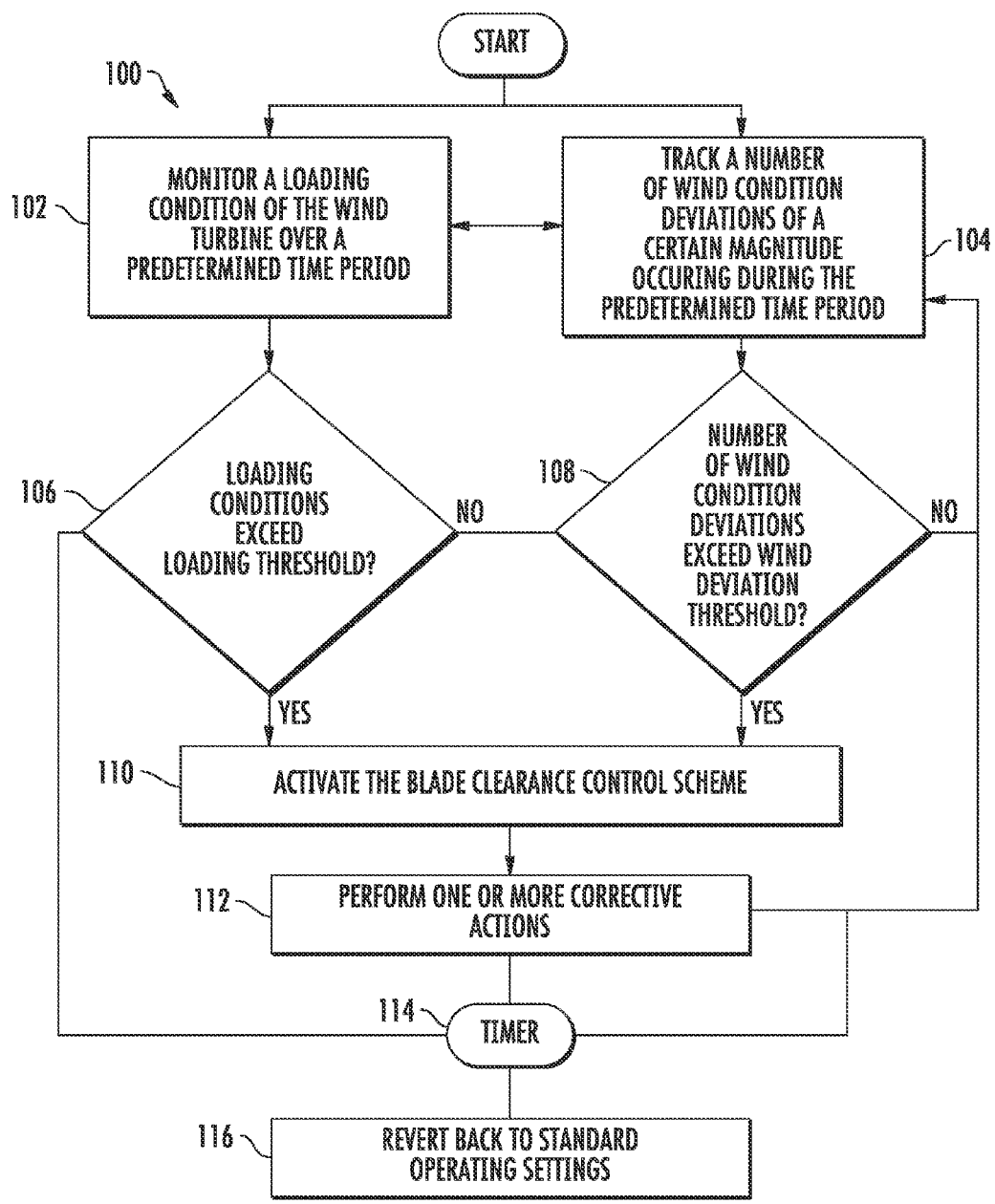
FIG. 6 illustrates a flow diagram of one embodiment of a method for monitoring and controlling the deflection of rotor blades of a wind turbine according to the present disclosure.

Accordingly, the present subject matter is directed to a system for monitoring and controlling the blade deflection of the rotor blades 22 of the wind turbine 10 so as to prevent tower strikes. For example, as shown in FIG. 6, a flow diagram of a blade clearance control scheme 100 that can be implemented by controller 36 is illustrated. Further, as shown at 102, the controller 36 is configured to monitor a loading condition of the wind turbine 10 over a predetermined time period. The predetermined time period may be any suitable time period, e.g. any number of seconds, minutes, hours, days, etc. In addition, the loading condition may be any suitable loading condition of the wind turbine 10. For example, in one embodiment, one or more of the sensors 48, 50, 52, 54, 56 are configured to measure the tower acceleration of the wind turbine tower 12. At 106, if the loading condition exceeds a loading threshold that is indicative of a certain magnitude of rotor blade deflection, then at 110, the controller 36 is configured to activate the blade clearance control scheme of the present disclosure.

Simultaneously, at 104, the controller 36 may also track a number of wind condition deviations of a certain amount or magnitude occurring during a predetermined time period. It should be understood that the predetermined time period for tracking the number of wind condition deviations may be equal to, greater than, or less than the predetermined time period for monitoring the loading conditions. Further, as used herein, a "wind condition deviation" may include any change or instability of a certain wind condition, such as for example, a wind direction deviation or instability or a significant change in wind speed that is representative of a wind gust, which may also be referred to herein as a "wind speed deviation." At 108, if the number of wind condition deviations exceeds a wind deviation threshold that is indicative of a certain magnitude of rotor blade deflection, then at 110, the controller 36 is configured to activate the blade clearance control scheme of the present disclosure. Thus, the blade clearance control scheme may be activated when either or both the number of wind condition deviations or the loading condition exceed their respective thresholds.

In certain embodiments, the controller 36 may determine the wind deviation threshold based on certain combinations of environmental conditions, normal turbine operation, and/or blade structural properties that can result in enough blade deflection to allow contact with the tower 12. For example, in particular embodiments, the controller 36 may determine the wind deviation threshold based on highly complex site topography, steep up-flow terrain angles, large hills or elevated terrain features upwind of the wind turbine 10, frequent periods of rapid and/or severe wind direction shifts, current wind conditions of the site, historical wind conditions recorded from the site, and/or gusty or turbulent wind conditions. The term "wind conditions" as used herein may include any suitable wind condition at or near the wind turbine 10, including but not limited to wind gusts, wind speed, wind direction, wind acceleration, wind turbulence, wind shear, wind veer, or wake conditions.

Similarly, the controller 36 may determine the loading threshold based on a variety of factors. For example, in one embodiment, the loading threshold may be determined as a function of an average loading condition of a rotor blade 22 over a certain time period and/or a standard deviation of a loading condition of a rotor blade 22 over a certain time period. In additional embodiments, the loading threshold may be a predetermined value set by the controller 36. Thus, the loading threshold may be fixed and/or updated according to one or more factors, such as environmental conditions, normal turbine operation, and/or normal blade structural properties (e.g. blade materials, size, age, etc.).

Accordingly, the thresholds described herein may be set such that detection of an over-threshold condition indicates that a blade deflection of a certain magnitude is occurring or is more probable in the current detected conditions and may cause damage if not corrected. As such, the blade clearance control scheme may be activated to reduce the likelihood of a tower strike. More specifically, at 112, the controller 36 is configured to perform one or more corrective actions so as to reduce blade deflection and protect the wind turbine 10 from a blade tower strike. For example, in one embodiment, the corrective action may include altering a blade pitch angle (e.g. one or more standard pitch settings) of at least one of the rotor blades 22. More specifically, the controller 36 may alter a blade pitch of one or more of the rotor blades 22. As indicated above, this may be accomplished by controlling a pitch adjustment system 32. Generally, altering the blade pitch of a turbine blade 22 reduces blade deflection by decreasing aerodynamic loads and increasing out-of-plane stiffness. Further, in one embodiment, the selected pitch angle is configured to alter conditions of the wind turbine 10 that are the most likely to cause the rotor blades 22 to deflect, e.g. when wind speeds are approximately mid-level wind speeds such as 6 to 17 meters per second (m/s). Thus, the additional blade pitch offset provides operational blade angles that are slightly higher than standard or normal pitch settings present before the blade clearance control scheme is activated. Accordingly, the corresponding torque, power, loads, and/or deflection of the wind turbine 10 and/or the rotor blades 22 may be reduced.

In addition to altering one or more of the standard pitch settings, the controller 36 may be configured to perform one or more additional corrective actions preventatively, such as by making a one-time parameter change, in anticipation of operating conditions that may present an increased likelihood of a tower strike, as well as reactively in response to blade deflection of one or more of the rotor blades 22. Regardless, the corrective action may allow a wind turbine 10 to be adaptable to varying operating conditions which may otherwise result in significant aerodynamic loading on the rotor blades 22. More specifically, the corrective action may include reducing standard operating limits for wind speed, de-rating the power output of the wind turbine, and/or reducing a torque of the wind turbine 10. Alternatively, the corrective action may include yawing the nacelle 16 to change the angle of the nacelle 16 relative to the direction 28 (FIG. 1) of the wind. The yaw drive mechanism 66 is typically used to change the angle of the nacelle 16 so that the rotor blades 22 are properly angled with respect to the prevailing wind.

It should be readily appreciated, however, that the controller 36 need not perform one of the corrective actions described above and may generally perform any corrective action designed to reduce blade deflection. Additionally, the controller 36 may be configured to perform multiple corrective actions simultaneously, which may include one or more of the corrective actions described above.

During and/or after the controller 36 performs the corrective action, the controller 36 can also continuously monitor the loading conditions and/or the wind condition deviations to ensure that the corrective action is effective in reducing deflection of the rotor blades 22. Thus, as shown at 116, the controller 36 may be configured to revert back to standard pitch angle settings (or standard operating settings that existed before the corrective action) after a certain amount of time (e.g. as determined via timer 114). For example, in one embodiment, the controller 36 may revert back to standard operating settings after a power output of the wind turbine 10 remains below a predetermined threshold for a specified time period. In another embodiment, the controller 36 is configured to revert back to standard operating conditions after the number of wind condition deviations and/or the loading condition of the wind turbine 10 remain below their respective thresholds for a specified time period.

Figure 7:
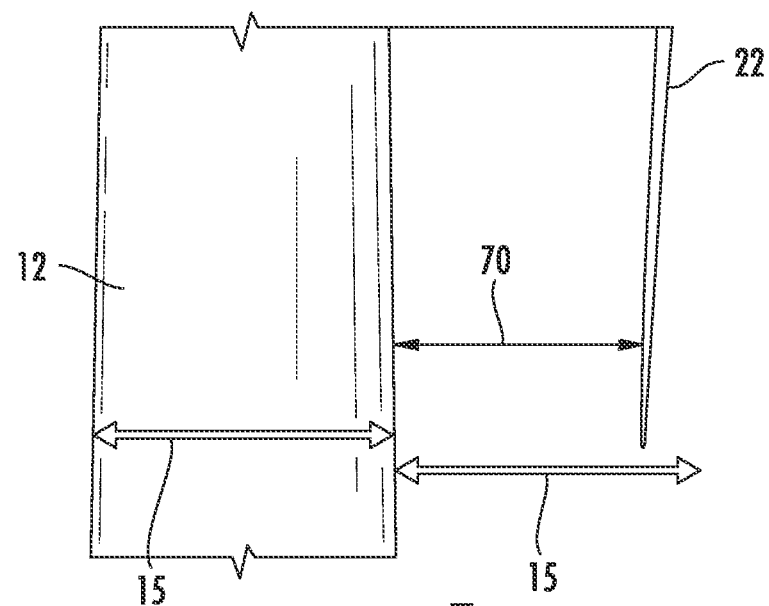
FIG. 7 illustrates a partial, side view of one embodiment of a wind turbine, particularly illustrating a rotor blade and a corresponding blade clearance according to conventional construction.
Figure 8:
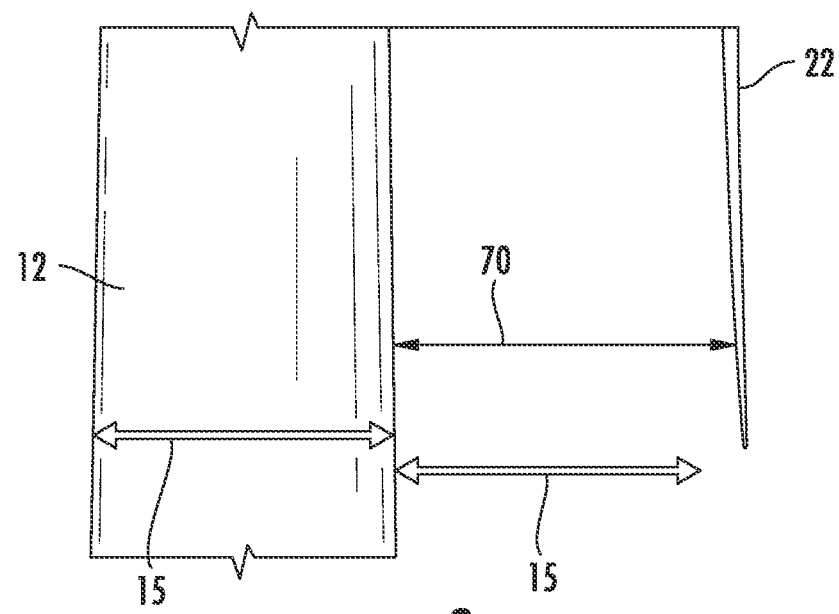
FIG. 8 illustrates a partial, side view of one embodiment of a wind turbine, particularly illustrating a rotor blade and a corresponding blade clearance according to the present disclosure.

The present disclosure as described herein provides various advantages not present in the prior art. For example, FIGS. 7 and 8 illustrate side, partial views of a wind turbine 10 during operation having a tower 12 with diameter 15 and a rotor blade 22 having a tower clearance 70. More specifically, FIG. 7 illustrates the tower clearance 70 of the rotor blade 22 without activating the blade clearance control scheme of the present disclosure, whereas FIG. 8 illustrates the tower clearance 70 of the rotor blade 22 in equivalent conditions as FIG. 7 with the blade clearance control scheme activated. As shown for comparison purposes only, the tower clearance 70 of FIG. 7 is less than the tower diameter 15, whereas the tower clearance 70 of FIG. 8 is greater than the tower diameter 15. Thus, the blade clearance control scheme decreases the likelihood of a blade tower strike by increasing the tower clearance 70.

Figure 9:
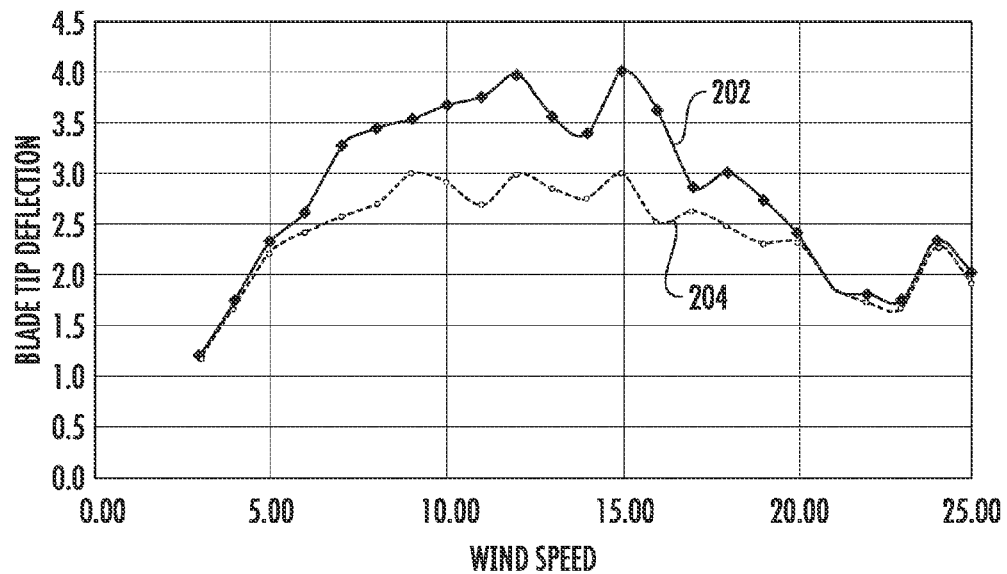
FIG. 9 illustrates a graph of one embodiment of blade deflection (y-axis) versus wind speed (x-axis) according to the present disclosure.
Figure 10:
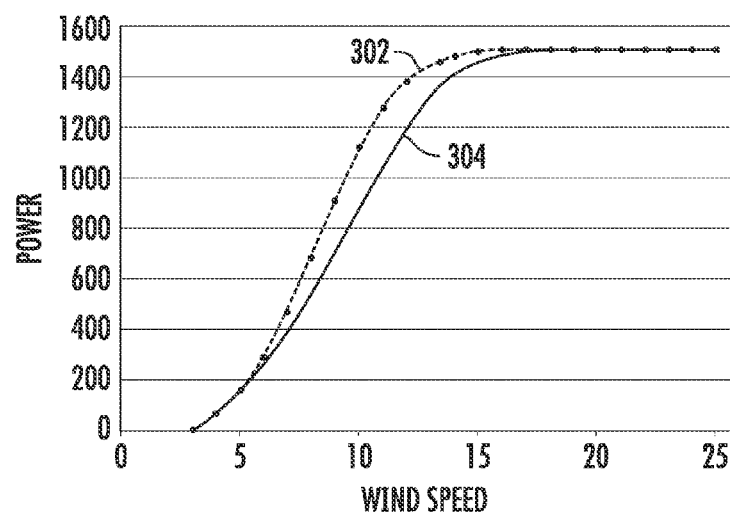
FIG. 10 illustrates a graph of one embodiment of power (x-axis) versus wind speed (x-axis) according to the present disclosure.
Figure 11:
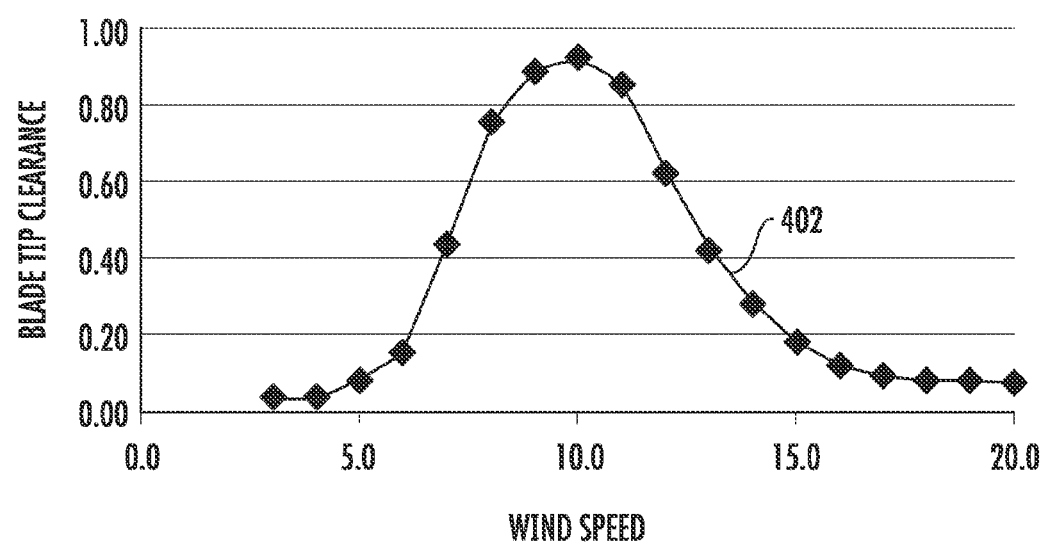
FIG. 11 illustrates a graph of one embodiment of the increase in blade tip clearance (y-axis) versus wind speed (x-axis) as compared to standard operating settings according to the present disclosure.

Referring now to FIGS. 9-11, various graphs illustrating further advantages of the blade clearance control scheme according to one embodiment of the present disclosure are shown. More specifically, FIG. 9 illustrates blade deflection versus wind speed, FIG. 10 illustrates power versus wind speed, and FIG. 11 illustrates the increase in the blade tip clearance versus wind speed as compared to standard operating settings. Referring particularly to FIG. 9, line 202 represents the blade deflection without activating the blade clearance control scheme, whereas line 204 represents the blade deflection with the blade clearance control scheme activated. As shown in the example illustrated embodiment, the blade deflection is substantially reduced, especially for wind speeds of between about 6 m/s and about 17 m/s. Referring to FIG. 10, line 302 represents the power (in kilowatts) produced by the wind turbine 10 without activating the blade clearance control scheme, whereas line 304 represents the power produced by the wind turbine 10 with the blade clearance control scheme activated. As shown, the power output is only marginally reduced when the control scheme is activated. For example, as shown in the example illustration, the control scheme typically only causes a power loss of 11% or less, such as for example, between about 5% to about 7%. Referring to FIG. 11, line 402 represents the increase in blade tip clearance as a function of wind speed as compared to standard operating settings. As shown in the example illustrated embodiment, the blade clearance control scheme typically provides the most noticeable blade tip clearance improvement at mid-level wind speeds, e.g. from about 6 m/s and about 17 m/s.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring and controlling deflection of rotor blades of wind turbine, the method comprising:
    operating the wind turbine at standard pitch angle settings for the rotor blades;
    monitoring a loading condition of the wind turbine over a predetermined time period;
    counting a number of wind condition deviations of a certain magnitude occurring during the predetermined time period; the certain magnitude representative of an instability of a wind condition of the wind turbine;
    altering one or more of the standard pitch angle settings of the rotor blades in response to the counted number of wind condition deviations exceeding a wind condition deviation threshold and the loading condition exceeding a loading threshold, wherein an exceedance above the wind condition deviation threshold and the loading threshold indicates an increased probability of a rotor blade deflection occurring in one or more of the rotor blades; and
    performing one or more corrective actions so as to reduce the probability of a rotor blade tower strike.

2. The method of claim 1, wherein the wind condition deviation comprises at least one of a wind direction deviation or a wind speed deviation.

3. The method of claim 1, wherein the loading condition comprises a tower acceleration.

4. The method of claim 1, further comprising determining the wind deviation threshold as a function of at least one of a site topography, terrain angles, current wind conditions of the site, or historical wind conditions recorded from the site.

5. The method of claim 4, wherein the current wind conditions or the wind condition of the wind turbine comprise at least one of a wind gust, a wind speed, a wind direction, a wind acceleration, a wind turbulence, a wind shear, a wind veer, or a wake.

6. The method of claim 1, further comprising determining the loading threshold as a function of an average loading condition and a standard deviation of the loading condition over a certain time frame.

7. The method of claim 1, wherein the one or more corrective actions comprise at least one of reducing standard operating limits for wind speed, de-rating the power output of the wind turbine, or reducing a torque of the wind turbine.

8. The method of claim 1, further comprising reverting to the standard pitch angle settings after a power output of the wind turbine remains below a predetermined power threshold for a specified time period.

9. The method of claim 1, further comprising reverting to the standard pitch angle settings after the number of wind condition deviations or the loading condition of the wind turbine drop below the wind deviation threshold and the loading threshold, respectively, for a specified time period.

10. A system for monitoring and controlling deflection of rotor blades of a wind turbine, the system comprising:
    one or more sensors configured to monitor a loading condition of the wind turbine over a predetermined time period; and,
    a controller communicatively coupled to the one or more sensors, the controller configured to perform one or more operations, the operations comprising:
        operating the wind turbine at standard pitch angle settings for the rotor blades,
        counting a number of wind condition deviations of a certain amount occurring during the predetermined time period, the certain amount representative of an instability of a wind condition of the wind turbine,
        altering one or more of the standard pitch angle settings of the rotor blades in response to the counted number of wind condition deviations exceeding a wind condition deviation threshold and the loading condition exceeding a loading threshold, wherein an exceedance above the wind condition deviation threshold and the loading threshold indicates an increased probability of a rotor blade deflection occurring in one or more of the rotor blades, and
        performing one or more corrective actions so as to reduce the probability of a rotor blade tower strike.

11. The system of claim 10, wherein the wind condition deviation comprises at least one of a wind direction deviation or a wind speed deviation.

12. The system of claim 10, wherein the loading condition comprises a tower acceleration.

13. The system of claim 10, wherein the controller is further configured to determine the wind deviation threshold as a function of at least one of a site topography, terrain angles, current wind conditions of the site, or historical wind conditions recorded from the site.

14. The system of claim 13, wherein the wind conditions comprise at least one of a wind gust, a wind speed, a wind direction, a wind acceleration, a wind turbulence, a wind shear, a wind veer, or a wake.

15. The system of claim 10, wherein the controller is further configured to determine the loading threshold as a function of an average loading condition and a standard deviation of the loading condition over a certain time frame.

16. The system of claim 10, wherein the one or more corrective actions comprise at least one of reducing standard operating limits for wind speed, de-rating the power output of the wind turbine, or reducing a torque of the wind turbine.

17. The system of claim 10, wherein the controller is further configured to revert to the standard pitch angle settings after a power output of the wind turbine remains below a predetermined power threshold for a specified time period.

18. The system of claim 10, further comprising reverting to the standard pitch angle settings after the number of wind condition deviations or the loading condition of the wind turbine drop below the wind deviation threshold and the loading threshold, respectively, for a specified time period.

19. A method for preventing rotor blade tower strike of a wind turbine, the method comprising:
- monitoring a tower acceleration of the wind turbine over a predetermined time period;
- counting wind condition deviations of a certain amount during the predetermined time period, the certain amount representative of an instability of a wind condition of the wind turbine; and,
- altering a blade pitch of at least one rotor blade of the wind turbine in response to the counted number of wind condition deviations exceeding a wind condition deviation threshold and the loading condition exceeding a loading threshold, wherein an exceedance above the wind condition deviation threshold and the loading threshold indicates an increased probability of a rotor blade deflection occurring in one or more of the rotor blades.

20. The method of claim 19, wherein the wind condition deviation comprises at least one of a wind direction deviation or a wind speed deviation.

* * * * *